(12) United States Patent
Gattere et al.

(10) Patent No.: US 12,460,930 B2
(45) Date of Patent: Nov. 4, 2025

(54) MEMS GYROSCOPE HAVING QUADRATURE COMPENSATION ELECTRODES AND METHOD FOR COMPENSATING A QUADRATURE ERROR

(71) Applicant: STMICROELECTRONICS S.r.l., Agrate Brianza (IT)

(72) Inventors: Gabriele Gattere, Castronno (IT); Manuel Riani, Como (IT); Carlo Valzasina, Gessate (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 363 days.

(21) Appl. No.: 18/048,370

(22) Filed: Oct. 20, 2022

(65) Prior Publication Data
US 2023/0135941 A1      May 4, 2023

(30) Foreign Application Priority Data

Oct. 29, 2021   (IT) .................. 102021000027764

(51) Int. Cl.
*G01C 19/5712*    (2012.01)
*B81B 3/00*       (2006.01)

(52) U.S. Cl.
CPC ........ *G01C 19/5712* (2013.01); *B81B 3/0051* (2013.01); *B81B 2201/0242* (2013.01)

(58) Field of Classification Search
CPC .............. G01C 19/5712; G01C 19/574; B81B 3/0051; B81B 2201/0242
See application file for complete search history.

(56) References Cited

U.S. PATENT DOCUMENTS

| 2006/0213265 | A1  | 9/2006  | Weber et al. |
| 2008/0000296 | A1* | 1/2008  | Johnson ............. G01C 19/5719 73/514.32 |
| 2008/0236280 | A1* | 10/2008 | Johnson ............. G01C 19/5726 73/504.14 |

(Continued)

FOREIGN PATENT DOCUMENTS

EP          1914512 A2    4/2008

*Primary Examiner* — David J Bolduc
(74) *Attorney, Agent, or Firm* — Seed Intellectual Property Law Group LLP

(57) ABSTRACT

The present disclosure is directed to a MEMS gyroscope formed by a substrate and a movable mass suspended on the substrate and configured to carry out a movement in a driving direction and in a detection direction perpendicular to each other. The movable mass has a first face and a second face opposite to the first face. The gyroscope also has a first and a second quadrature compensation electrode group, fixed to the substrate and capacitively coupled to the movable mass. The first quadrature compensation electrode group faces the first face of the movable mass, and the second quadrature compensation electrode group faces the second face of the movable mass. The first and the second quadrature compensation electrode groups each have a respective variable facing area on the movable mass as a result of the movement of the movable mass in the driving direction and are configured to exert an electrostatic force on the movable mass during the movement of the movable mass in the driving direction.

20 Claims, 5 Drawing Sheets

(56) References Cited

U.S. PATENT DOCUMENTS

| | | | |
|---|---|---|---|
| 2009/0241662 A1* | 10/2009 | Supino | G01C 19/5719 73/514.32 |
| 2009/0255336 A1* | 10/2009 | Horning | G01P 15/125 73/504.12 |
| 2013/0019680 A1* | 1/2013 | Kittilsland | G01C 19/5712 73/504.12 |
| 2016/0187370 A1* | 6/2016 | Ikehashi | G01L 19/0618 73/514.32 |
| 2017/0284804 A1* | 10/2017 | Gattere | G01C 25/00 |
| 2018/0038692 A1 | 2/2018 | Prati et al. | |
| 2019/0072389 A1* | 3/2019 | Prati | G06F 12/0817 |
| 2019/0120657 A1 | 4/2019 | Senkal et al. | |
| 2020/0049505 A1* | 2/2020 | Gattere | G01C 19/5712 |
| 2020/0278205 A1* | 9/2020 | Kraver | B81B 7/02 |
| 2020/0400434 A1* | 12/2020 | Guerinoni | G01C 19/574 |
| 2021/0221677 A1* | 7/2021 | Shao | B81C 1/00182 |

* cited by examiner

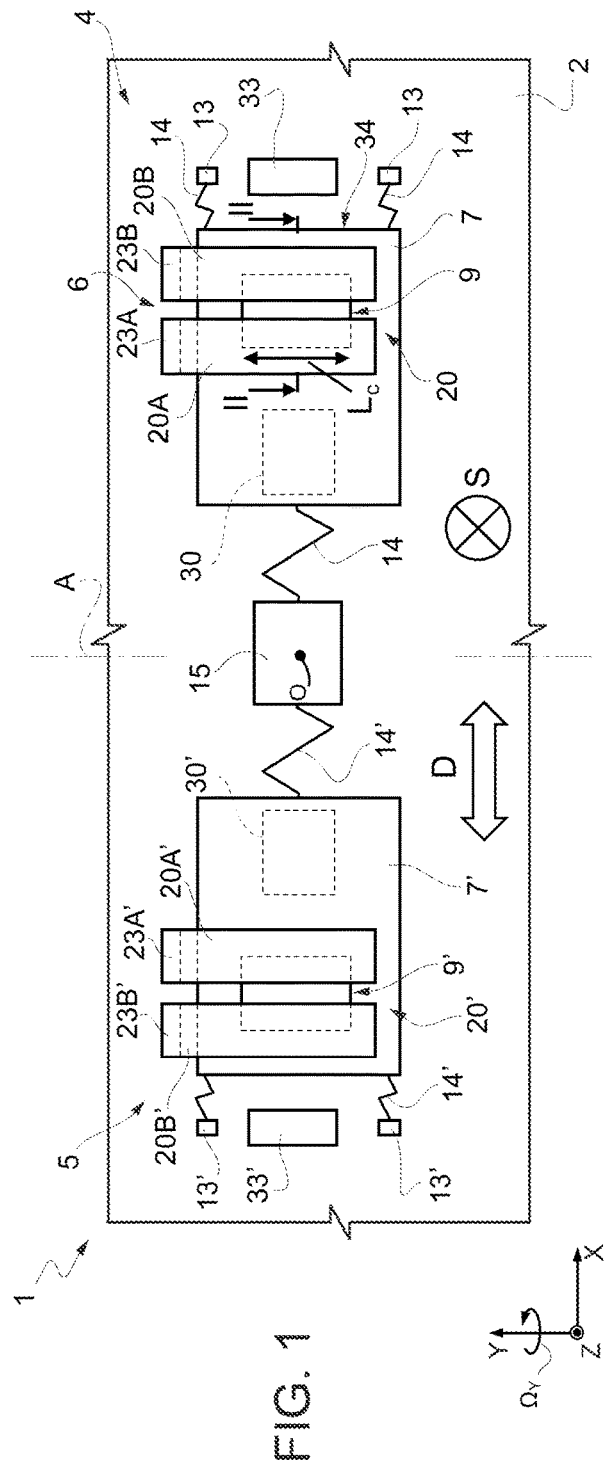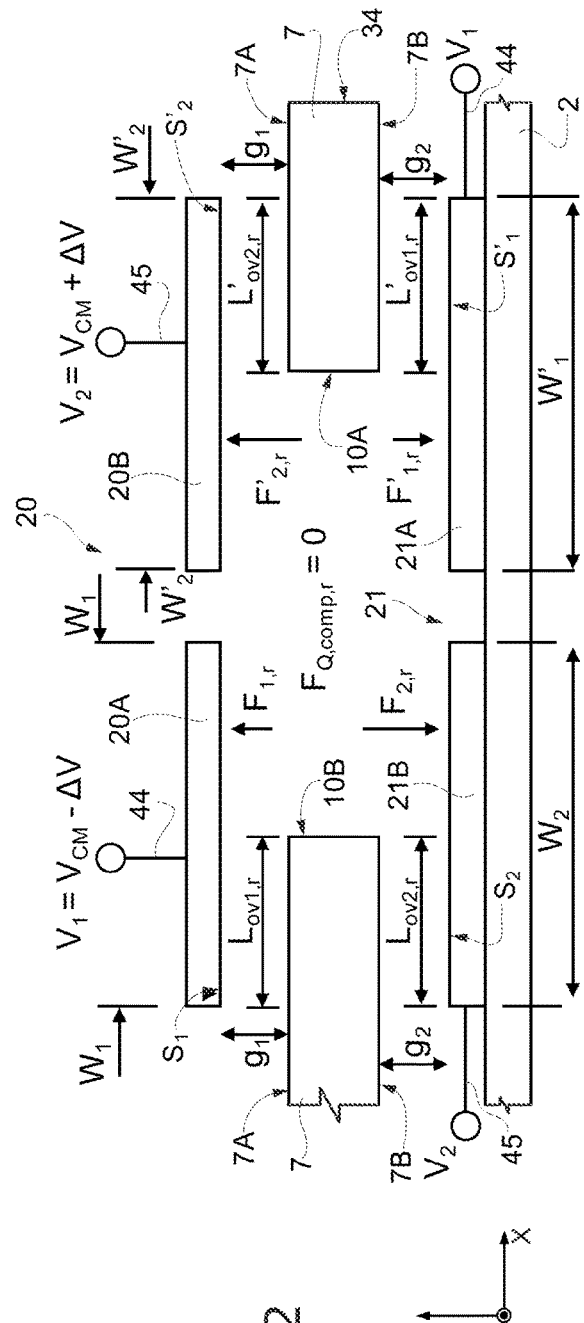

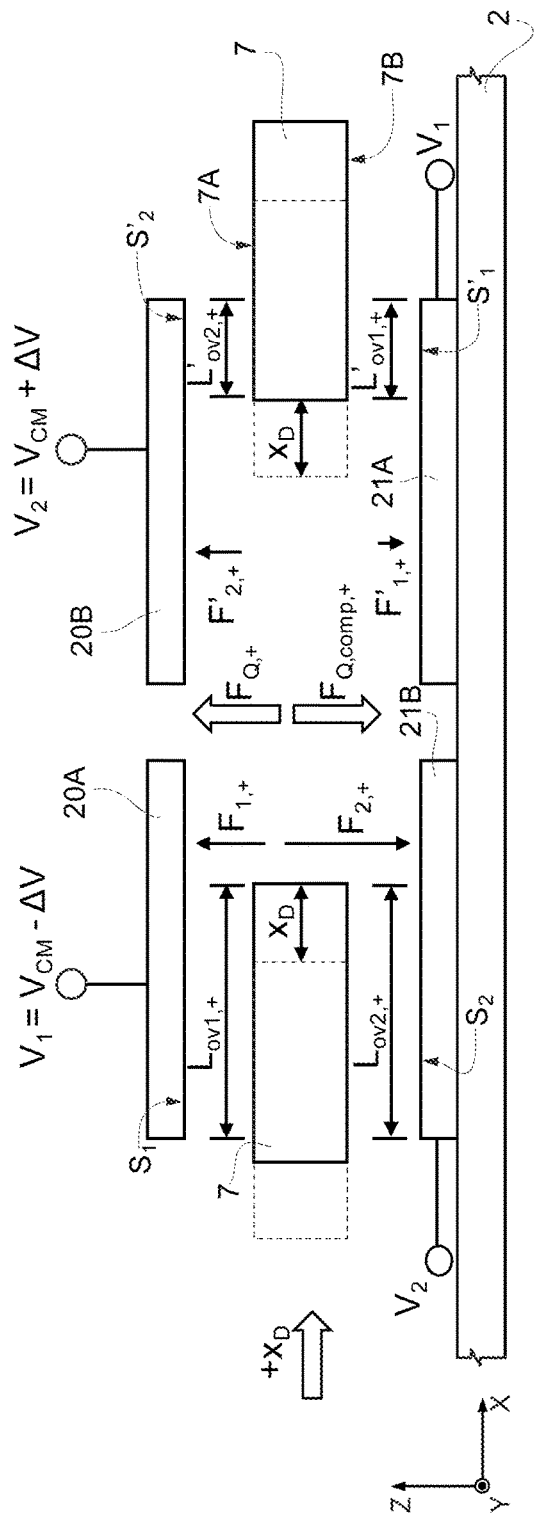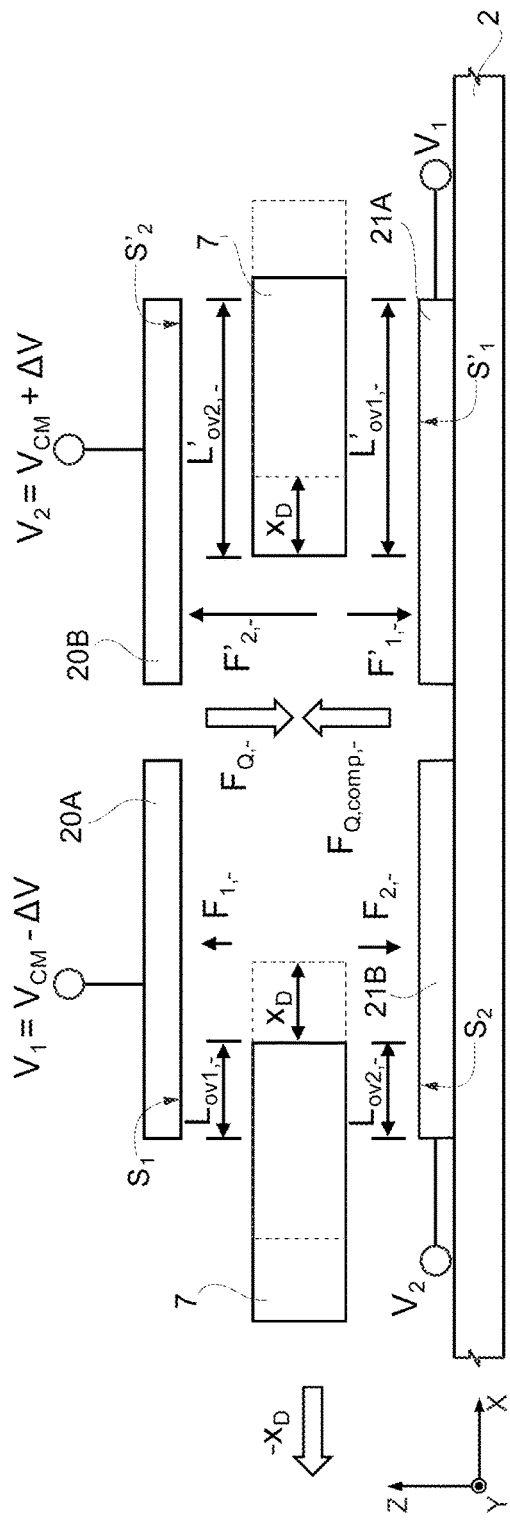
FIG. 3
FIG. 4

MEMS GYROSCOPE HAVING QUADRATURE COMPENSATION ELECTRODES AND METHOD FOR COMPENSATING A QUADRATURE ERROR

BACKGROUND

Technical Field

The present disclosure relates to a MEMS gyroscope having quadrature compensation electrodes and to a method for compensating a quadrature error.

Description of the Related Art

As is known, a gyroscope made using MEMS ("Micro Electro-Mechanical Systems") technology is formed in a die of semiconductor material, e.g., silicon, and comprises at least one or more movable masses suspended on a substrate and free to oscillate with respect to the substrate with one or more degrees of freedom.

The movable masses are capacitively coupled to the substrate through driving electrodes, configured to cause an oscillation of the movable masses along a driving direction, and detection electrodes, configured to detect a displacement of the movable masses along a detection direction.

When the MEMS gyroscope rotates with an angular speed around a rotation axis, a movable mass that oscillates with a linear velocity along a direction perpendicular to the rotation axis is subject to a Coriolis force directed along a direction perpendicular to the rotation axis and to the linear velocity direction.

In particular, MEMS gyroscopes of monoaxial, biaxial or triaxial type are known, configured to detect a movement of the movable mass perpendicular to an extension plane of the movable mass and associated with a roll or pitch angular speed of the MEMS gyroscope around an axis lying in the extension plane of the movable mass.

Due to imperfections, for example associated with variabilities in the manufacturing process of the MEMS gyroscope, the movable mass is subject, in use, when moving in the driving direction, to a quadrature force directed along the detection direction.

This quadrature force causes a movement of the movable mass in the detection direction, even in the absence of a Coriolis force, which is detected by the detection electrodes.

The quadrature error thus reduces the detection performances of the MEMS gyroscope.

In MEMS gyroscopes wherein the detection direction is perpendicular to the extension plane of the movable mass, one approach is to design quadrature-cancellation electrodes capacitively coupled to the movable mass and arranged below the movable mass, i.e., arranged between the substrate and the movable mass. In practice, in such MEMS gyroscopes, the quadrature-cancellation electrodes are arranged on one side with respect to the movable mass.

In use, the compensation electrodes are suitably biased, through an external control circuit, so as to generate an electrostatic force on the movable mass which compensates for the quadrature force.

However, the voltage applied to the quadrature-cancellation electrodes causes a phenomenon known as electrostatic softening, which causes a variation of the resonance frequency of a vibration mode of the MEMS gyroscope that is used to detect the Coriolis force.

During the life of these MEMS gyroscopes, external factors such as temperature, humidity and mechanical stress may cause a variation of the capacitive coupling between the quadrature-cancellation electrodes and the movable mass, for example they may modify the gap between the quadrature-cancellation electrodes and the movable mass.

The variation of capacitive coupling causes, in these MEMS gyroscopes, a variation of the extent of the electrostatic softening phenomenon which in turn causes a variation of the resonance frequency. As a result, these MEMS gyroscopes have an unstable resonance frequency.

The instability of the resonance frequency of MEMS gyroscopes degrades the detection performances of the same MEMS gyroscopes, in particular it degrades the sensitivity thereof.

According to one approach, in order to reduce the sensitivity of the MEMS gyroscope to variations of the capacitive coupling between the quadrature-cancellation electrodes and the movable mass, the MEMS gyroscope is encapsulated or packaged within a body of a specific material, for example ceramic.

However, such specific packages have a high cost.

Furthermore, even when using these specific materials for the package, the sensitivity of the MEMS gyroscope is not sufficiently stable for specific applications wherein a high accuracy and reliability of the MEMS gyroscope are desired.

BRIEF SUMMARY

Various embodiments of the present disclosure overcome the disadvantages of the prior art.

According to the present disclosure, a MEMS gyroscope and a method for compensating a quadrature error of a MEMS gyroscope are therefore provided.

The MEMS gyroscope is formed by a substrate and a movable mass suspended on the substrate and configured to carry out a movement in a driving direction and in a detection direction perpendicular to each other. The movable mass has a first face and a second face opposite to the first face. The gyroscope also has a first and a second quadrature compensation electrode group, fixed to the substrate and capacitively coupled to the movable mass. The first quadrature compensation electrode group faces the first face of the movable mass, and the second quadrature compensation electrode group faces the second face of the movable mass.

The first and the second quadrature compensation electrode groups each have a respective variable facing area on the movable mass as a result of the movement of the movable mass in the driving direction and are configured to exert an electrostatic force on the movable mass during the movement of the movable mass in the driving direction.

BRIEF DESCRIPTION OF THE SEVERAL VIEWS OF THE DRAWINGS

For a better understanding of the present disclosure, some embodiments thereof are now described, purely by way of non-limiting example, with reference to the attached drawings, wherein:

FIG. 1 shows a top-plan view of the present MEMS gyroscope, according to an embodiment;

FIG. 2 shows a cross-section of the MEMS gyroscope of FIG. 1, at rest, along section line II-II of FIG. 1;

FIG. 3 shows a cross-section of the MEMS gyroscope of FIG. 1, along section line II-II, in a condition of use;

FIG. 4 shows a cross-section of the MEMS gyroscope of FIG. 1, along section line II-II, in a different condition of use;

Figure 1A:
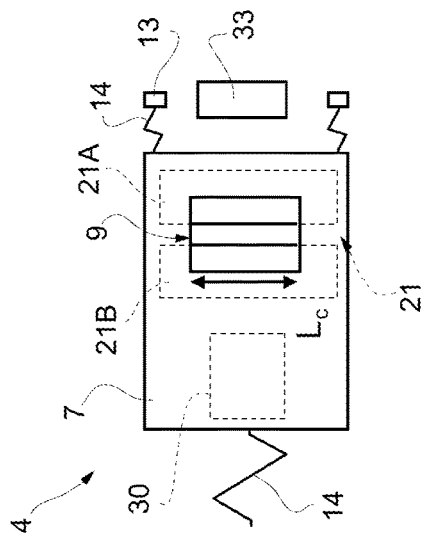
FIG. 1A shows a top-plan view of a portion of the MEMS gyroscope of FIG. 1.

The following description refers to the arrangement shown; consequently, expressions such as "above," "below," "top," "bottom," "right," "left" relate to the attached figures and are not to be intended in a limiting manner.

DETAILED DESCRIPTION

FIGS. 1 and 2 show a MEMS gyroscope 1 in a Cartesian reference system XYZ comprising a first axis X, a second axis Y and a third axis Z.

The MEMS gyroscope 1 is formed in a die of semiconductor material, e.g., silicon, and comprises a substrate or support structure 2.

The MEMS gyroscope 1 is of monoaxial type and comprises one or more detection units, here a first and a second detection unit 4, 5, each configured to detect a roll angular speed $\Omega_Y$ of the MEMS gyroscope 1 around the second axis Y.

In this embodiment, the first and the second detection units 4, 5 are equal to each other and arranged symmetrically with respect to a central plane A passing through a center O of the MEMS gyroscope 1 and parallel to a plane YZ formed by the second axis Y and by the third axis Z.

Hereinafter, the description will refer, for sake of simplicity, to the first detection unit 4. However, what has been described for the first detection unit 4 also refers to the second detection unit 5, unless otherwise specified.

The first detection unit 4 comprises a movable mass 7, for example of silicon or polysilicon, suspended on the substrate 2 and having a top surface 7A and a bottom surface 7B.

The first detection unit 4 comprises a quadrature compensation unit 6, configured to cancel, in use, a quadrature force acting on the movable mass 7, as described in detail below.

The movable mass 7 is substantially planar and has a main extent parallel to a plane XY formed by the first axis X and by the second axis Y.

The movable mass 7 has an opening 9, here of rectangular shape and having a length $L_c$ along the second axis Y, which extends between the top surface 7A and the bottom surface 7B of the movable mass 7.

In detail, the movable mass 7 has a first inner wall 10A and a second inner wall 10B which laterally delimit, along the second axis Y, the opening 9.

In this embodiment, the first inner wall 10A and the second inner wall 10B each extend parallel to a respective plane parallel to the plane YZ.

However, the opening 9 may have a different shape and/or the first and the second walls 10A, 10B may extend along different planes.

The movable mass 7 is coupled to anchoring regions 13, fixed to the substrate 2, through flexures 14 each extending between the movable mass 7 and a respective anchoring region 13, parallel to the first axis X.

The MEMS gyroscope 1 further comprises a central anchoring region 15, fixed to the substrate 2.

The movable mass 7 is coupled to the central anchoring region 15 through a respective flexure 14.

The flexures 14 may be linear or folded elastic elements and are configured to allow the movement of the movable mass 7 with one or more degrees of freedom.

In detail, in this embodiment, the flexures 14 allow the movement of the movable mass 7 along the first axis X and the third axis Z.

The first detection unit 4 further comprises a top compensation electrode group 20, arranged on a first side along the third axis Z with respect to the movable mass 7 (at the top in FIGS. 1 and 2), and a bottom compensation electrode group 21, arranged on a second side opposite to the first side along the third axis Z with respect to the movable mass 7 (at the bottom in FIG. 2).

The top compensation electrode group 20, the bottom compensation electrode group 21 and the opening 9 form the quadrature compensation unit 6.

In this embodiment, the top compensation electrode group 20 comprises a first top electrode 20A and a second top electrode 20B, of semiconductor material such as for example silicon or polysilicon.

The first top electrode 20A and the second top electrode 20B each extend at a higher coordinate, along the third axis Z, with respect to the top surface 7A of the movable mass 7, from a respective anchoring pillar 23A, 23B fixed to the substrate 2.

The anchoring pillars 23A, 23B, identified for sake of clarity by a dashed line in FIG. 1, here extend externally to the movable mass 7, on one side of the movable mass 7 along the second axis Y.

However, the number and the arrangement of the anchoring pillars 23A, 23B may be different, for example as a function of the specific shape of the movable mass 7, of the opening 9 and of the first and the second top electrodes 20A, 20B.

With reference to FIG. 2, the first top electrode 20A extends suspended above the movable mass 7, at a first height $g_1$ along the third axis Z from the top surface 7A of the movable mass 7, and has a width $W_1$ along the first axis X, which may be chosen as a function of a maximum displacement of the movable mass 7, in use, along the first axis X, as described below.

In this embodiment, the first top electrode 20A extends along a direction parallel to the second axis Y on the second inner wall 10B of the movable mass 7, partially facing the top surface 7A of the movable mass 7 and partially on the opening 9. Stated differently, the first top electrode 20A overlaps both the top surface 7A of the movable mass 7 and the opening 9

The first top electrode 20A extends throughout the length $L_c$ of the opening 9, in particular here it has a greater length. However, the first top electrode 20A may have a smaller length than the length $L_c$ of the opening 9.

In detail, the first top electrode 20A has, at the second inner wall 10B, a variable surface $S_1$ facing and overlapping the top surface 7A of the movable mass 7 and having, at rest, a width $L_{ov1,r}$ along the first axis X, for example equal to half the width $W_1$.

The second top electrode 20B extends suspended on the movable mass 7, at the first height $g_1$ along the third axis Z from the top surface 7A of the movable mass 7, and has a width $W'_2$ along the first axis X, which may be chosen as a function of a maximum displacement of the movable mass 7, in use, along the first axis X, as described below.

However, the first top electrode 20A and the second top electrode 20B may extend to heights different from each other from the top surface 7A of the movable mass 7.

In this embodiment, the width $W'_2$ of the second top electrode 20B is equal to the width $W_1$ of the first top electrode 20A. However, the width $W'_2$ and the width $W_1$ may be different from each other.

The second top electrode 20B extends along a direction parallel to the second axis Y on the first inner wall 10A of the movable mass 7, partially facing the top surface 7A of the movable mass 7 and partially on the opening 9. Stated differently, the second top electrode 20B overlaps both the top surface 7A of the movable mass 7 and the opening 9.

In detail, the second top electrode 20B has, at the first inner wall 10A, a variable surface $S'_2$ facing and overlapping the top surface 7A of the movable mass 7 and having, at rest, a width $L'_{ov2,r}$ along the first axis X, for example equal to half the width $W_2$, here equal to the width $L_{ov1,r}$ of the variable surface $S_1$ of the first top electrode 20A.

The second top electrode 20B is equal to the first top electrode 20A, translated parallel to the first axis X. However, the first top electrode 20A and the second top electrode 20B may have shapes and dimensions different from each other.

In this embodiment, the bottom compensation electrode group 21 comprises a first bottom electrode 21A and a second bottom electrode 21B, of semiconductor material such as for example silicon or polysilicon.

The first bottom electrode 21A and the second bottom electrode 21B are fixed to the substrate 2 and each extend to a smaller coordinate along the third axis Z with respect to the bottom surface 7B of the movable mass 7.

In detail, the first bottom electrode 21A extends below a respective portion of the movable mass 7, at a second height $g_2$ along the third axis Z from the bottom surface 7B of the movable mass 7, and has a width $W'_1$ along the first axis X, which may be chosen as a function of a maximum displacement of the movable mass 7, in use, along the first axis X, as described below.

In this embodiment, the first bottom electrode 21A extends parallel to the second top electrode 20B, under the first inner wall 10A of the movable mass 7, partially facing the bottom surface 7B of the movable mass 7 and partially under the opening 9.

As shown in FIG. 1A, wherein the top compensation electrode group 20 is shown transparently for sake of clarity, the first bottom electrode 21A has, in this embodiment, a length, parallel to the second axis Y, greater than the length $L_c$ of the opening 9. However, the first bottom electrode 21A may have a smaller length than the length $L_c$ of the opening 9.

Furthermore, here, the first bottom electrode 21A has a length, along the second axis Y, equal to the length, along the second axis Y, of the portion of the second top electrode 20B facing the top surface 7A of the movable mass 7.

In detail, again with reference to FIG. 2, the first bottom electrode 21A has, at the first inner wall 10A, a variable surface $S'_1$ facing and overlapping the bottom surface 7B of the movable mass 7 and having, at rest, a width $L'_{ov1,r}$ along the first axis X, for example equal to half the width $W'_1$.

In this embodiment, the width $L'_{ov1,r}$ of the variable surface $S'_1$ of the first bottom electrode 21A is equal to the width $L_{ov1,r}$ of the variable surface $S_1$ of the first top electrode 20A. However, the width $L'_{ov1,r}$ may be different from the width $L_{ov1,r}$.

The second bottom electrode 21B extends below a respective portion of the movable mass 7, at the second height $g_2$ along the third axis Z from the bottom surface 7B of the movable mass 7 and has a width $W_2$ along the first axis X, which may be chosen as a function of a maximum displacement of the movable mass 7, in use, along the first axis X, as described below.

The width $W_2$ of the second bottom electrode 21B may be equal to or different from, here equal to, the width $W'_2$ of the first bottom electrode 21A.

In this embodiment, the second bottom electrode 21B extends parallel to the first top electrode 20A under the second inner wall 10B of the movable mass 7, partially facing the bottom surface 7B of the movable mass 7 and partially under the opening 9.

As shown in FIG. 1A, the second bottom electrode 21B has a length, parallel to the second axis Y, greater than the length $L_c$ of the opening 9. However, the second bottom electrode 21B may have a smaller length than the length $L_c$ of the opening 9.

The second bottom electrode 21B may have a length, along the second axis Y, equal or different, here equal, with respect to the first bottom electrode 21A.

In detail, again with reference to FIG. 2, the second bottom electrode 21B has a variable surface $S_2$ facing and overlapping the bottom surface 7B of the movable mass 7 and having, at rest, a width $L_{ov2,r}$ along the first axis X, for example equal to half the width $W_2$.

In this embodiment, the width $L_{ov2,r}$ of the variable surface $S_2$ of the second bottom electrode 21B is equal to the width $L'_{ov2,r}$ of the variable surface $S'_2$ of the second top electrode 20B. However, the width $L_{ov2,r}$ may be different from the width $L'_{ov2,r}$.

In practice, in this embodiment, the first top electrode 20A, the first bottom electrode 21A, the second top electrode 20B and the second bottom electrode 21B have, at rest, a same facing area on the movable mass 7. However, the first top electrode 20A, the first bottom electrode 21A, the second top electrode 20B and the second bottom electrode 21B may have different facing areas on the movable mass 7. For example, the first top electrode 20A may have a same facing area as the first bottom electrode 21A, or the second top electrode 20B may have a same facing area as the second bottom electrode 21B.

The first detection unit 4 also comprises a fixed detection electrode 30 (represented by a dashed line in FIG. 1), which is fixed to the substrate 2 and extends under a respective portion of the movable mass 7, facing the bottom surface 7B of the movable mass 7.

The fixed detection electrode 30 is capacitively coupled to the movable mass 7 and is configured to detect a movement of the movable mass 7 along a detection axis S parallel to the third axis Z.

The first detection unit 4 also comprises a fixed driving electrode 33 extending at a distance, along the first axis X, from an outer wall 34 of the movable mass 7.

The fixed driving electrode 33 is capacitively coupled to the movable mass 7 and is configured to cause a movement of the movable mass 7 along a driving axis D parallel to the first axis X.

The second detection unit 5 is equal to the first detection unit 4; as a result, the elements of the second detection unit 5 are indicated by the same reference numerals, with the addition of an apex, as the respective elements of the first detection unit 4 and are not further described in detail.

The second detection unit 5 is formed by a movable mass 7' having an opening 9' and coupled to the central anchoring portion 15 and to respective anchoring regions 13' through flexures 14'.

The second detection unit 5 comprises a respective top compensation electrode group 20' and a respective bottom compensation electrode group, not shown here.

The top compensation electrode group 20' also includes here a first top electrode 20A' and a second top electrode 20B' each fixed to the substrate 2 through a respective anchoring pillar 23A', 23B'.

Furthermore, the second detection unit 5 comprises a respective fixed detection electrode 30' and a respective fixed driving electrode 33', coupled to the movable mass 7' to detect a movement thereof along the detection axis S and, respectively, drive a movement thereof along the driving axis D.

Hereinafter an operation of the MEMS gyroscope 1 will be described with reference to the first detection unit 4. However, as it will become clear to the person skilled in the art, what described with reference to the first detection unit 4 applies, mutatis mutandis, also to the second detection unit 5, unless otherwise specified.

In use, when it is desired to detect a rotation of angular speed $\Omega_Y$ of the MEMS gyroscope 1 around the second axis Y, the fixed driving electrodes 33, 33' of the first and the second detection units 4, 5 may be suitably biased so as to cause a movement of the movable mass 7 of the first detection unit 4 and of the movable mass 7' of the second detection unit 5, in particular to cause an oscillation at a respective resonance frequency, along the driving axis D.

In detail, the displacement of the movable mass 7 along the driving axis D, with respect to the equilibrium/rest position shown in FIG. 2, for example the position variation of the first inner wall 10A or of the second inner wall 10B with respect to the equilibrium/rest position of FIG. 2, will be indicated hereinafter as offset $X_D$. When the movable mass 7 oscillates along the driving axis D, in the presence of the angular speed 22Y, the movable mass 7 is affected by a Coriolis force directed along the detection axis S. The Coriolis force causes a displacement of the movable mass 7 along the detection axis S, thus generating a capacitance variation between the movable mass 7 and the detection electrode 30, which may be detected by an external control circuit, not shown here.

For example, to obtain a differential detection of the angular speed $\Omega_Y$ by the MEMS gyroscope 1, the fixed driving electrodes 33, 33' may be biased, in a per se known manner, such that the movable masses 7, 7' mutually oscillate in counterphase along the driving axis D.

When the movable mass 7 is driven in oscillation along the driving axis D, the movable mass 7 may be subject to a quadrature force parallel to the detection axis S, even in the absence of the angular speed $\Omega_Y$. This quadrature force may be caused by structural asymmetries of the MEMS gyroscope 1, for example asymmetries in the flexures 14 due to process variabilities during the manufacturing of the MEMS gyroscope 1.

For the purposes of the discussion that follows, it is assumed, by way of example, that the movable mass 7 is subject, when moving towards increasing coordinates along the driving axis D (FIG. 5), i.e., to the right in FIGS. 1 and 2, to a quadrature force parallel to the third axis Z and directed upwards, i.e., which would cause the movable mass 7 to move towards the top compensation electrode group 20.

As a result, it is assumed that the movable mass 7 is subject, when moving towards decreasing coordinates of the driving axis D, i.e., to the left in FIGS. 1 and 2, to a quadrature force parallel to the third axis Z and directed downwards, i.e., which would cause the movable mass 7 to move towards the bottom compensation electrode group 21.

To compensate for the contribution of the quadrature force on the movable mass 7, a first voltage $V_1$ is applied to the first top electrode 20A and to the first bottom electrode 21A and a second voltage $V_2$ is applied to the second top electrode 20B and to the first bottom electrode 21A, for example through the external control circuit.

In this regard, the first top electrode 20A and the first bottom electrode 21A may be coupled to respective voltage application elements 44, for example connection tracks or pads, indicated schematically in FIG. 2, which allow the biasing thereof to the first voltage $V_1$.

The second top electrode 20B and the second bottom electrode 21B may be coupled to respective voltage application elements 45, for example connection tracks or pads, indicated schematically in FIG. 2, which allow the biasing thereof to the second voltage $V_2$.

The first voltage $V_1$ may be equal to $V_{CM}-\Delta V$ and the second voltage $V_2$ may be equal to $V_{CM}+\Delta V$, where $V_{CM}$ is a common mode voltage and $\Delta V$ a differential corrective voltage. The common mode voltage $V_{CM}$ and the differential corrective voltage $\Delta V$, for example of continuous type, may be determined in a calibration step of the MEMS gyroscope 1.

Each of the first top electrode 20A, the second top electrode 20B, the first bottom electrode 21A and the second bottom electrode 21B exerts a respective electrostatic force on the movable mass 7.

In detail, at rest, the first and the second top electrodes 20A, 20B exert, on the movable mass 7, respectively a force $F_{1,r}$ and a force $F'_{1,r}$ equal in magnitude but directed along two opposite directions parallel to the detection axis S.

In fact, at rest, in the embodiment shown in FIGS. 1 and 2, the first and the second top electrodes 20A, 20B are at a same distance (first height $g_1$ and second height $g_2$) from the movable mass 7, have a same facing surface on the movable mass 7, and are at the same voltage with respect to the movable mass 7.

Similarly, the first and the second bottom electrodes 21A, 21B exert, on the movable mass 7, respectively a force $F_{2,r}$ and a force $F'_{2,r}$ equal in magnitude but directed along two opposite directions parallel to the detection axis S.

In fact, in the embodiment shown in FIGS. 1 and 2, the first and the second bottom electrodes 21A, 21B are at a same distance (first height $g_1$ and second height $g_2$) from the movable mass 7, have a same facing surface on the movable mass 7, and are at the same voltage with respect to the movable mass 7.

Furthermore, the force $F_{1,r}$ exerted by the first top electrode 20A is lower than the force $F'_{2,r}$ exerted by the second top electrode 20B, since the first voltage $V_1$ is lower than the second voltage $V_2$.

Figure 5:
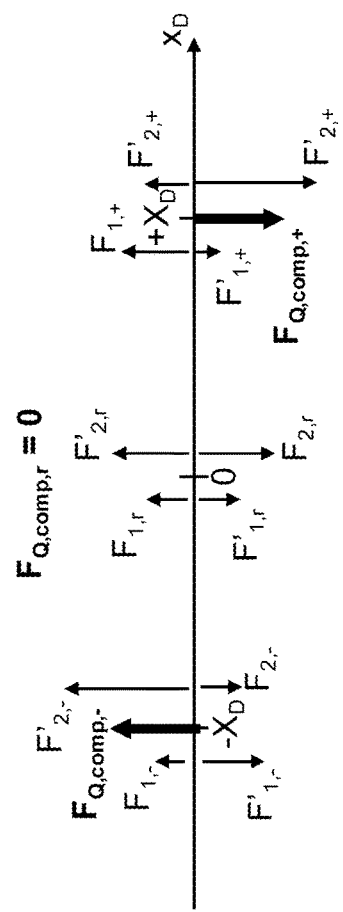
FIG. 5 shows a schematic representation of forces acting on a movable mass of the MEMS gyroscope of FIG. 1, in the conditions of use of FIGS. 2-4.

In practice, as also schematically shown in FIG. 5, in the equilibrium position (FIG. 2), the movable mass 7 is subject, as a whole, to a quadrature compensation force $F_{Q,comp,r}$ that is zero.

Furthermore, in the equilibrium position, the quadrature force is also zero. In fact, the quadrature force is proportional to the offset $X_D$ of the movable mass 7.

When the movable mass 7 has a positive offset $X_D$, i.e., it moves towards increasing coordinates along the driving axis D (to the right in FIG. 3), the movable mass 7 is subject to a variable quadrature compensation force $F_{Q,comp}$, parallel to the detection axis S and directed downwards in FIG. 3.

In detail, when the movable mass 7 moves to the right, the area of the variable surface $S_1$ of the first top electrode 20A and the area of the variable surface $S_2$ of the second bottom electrode 21B increase with respect to the rest condition of FIG. 2.

Conversely, the area of the variable surface $S'_2$ of the second top electrode 20B and the area of the variable surface $S'_1$ of the first bottom electrode 21A decrease with respect to the rest condition of FIG. 2.

By way of example, FIG. 3 shows the MEMS gyroscope 1 along section line II-II of FIG. 1, when the movable mass 7 is subject to a maximum and positive offset $X_D$, equal to $+X_D$, with respect to the equilibrium position. In FIG. 3, the rest position of the movable mass 7 is indicated for sake of clarity by a dashed line.

In the condition of maximum positive offset $+X_D$, a maximum positive quadrature force $F_{Q,+}$, directed upwards in FIG. 3, acts on the movable mass 7.

In detail, in the condition of maximum positive offset $+X_D$ of FIG. 3, the variable surface $S_1$ of the first top electrode 20A has a maximum width $L_{ov1,+}$, greater than the respective width $L_{ov1,r}$ of the rest condition of FIG. 2.

In particular, here, it is $L_{ov1,+}=L_{ov1,r}+X_D$.

As a result, the first top electrode 20A exerts, on the movable mass 7, an electrostatic force $F_{1,+}$ that is greater than the electrostatic force $F_{1,r}$ of the rest condition of FIG. 2.

Similarly, in the condition of maximum positive offset $+X_D$ of FIG. 3, the variable surface $S_2$ of the second bottom electrode 21B has a maximum width $L_{ov2,+}$, greater than the respective width $L_{ov2,r}$ of the rest condition of FIG. 2.

In particular, here, $L_{ov2,+}=L_{ov2,r}+X_D$.

As a result, the second bottom electrode 21B exerts, on the movable mass 7, an electrostatic force $F_{2,+}$ that is greater than the electrostatic force $F_{2,r}$ of the rest condition of FIG. 2.

Furthermore, the electrostatic force $F_{1,+}$ exerted by the first top electrode 20A is lower, in magnitude, than the electrostatic force $F_{2,+}$ exerted by the second bottom electrode 21B, since the first voltage $V_1$ is lower than the second voltage $V_2$.

Again with reference to the condition of maximum positive offset $+X_D$ of FIG. 3, the variable surface $S'_2$ of the second top electrode 10B has a minimum width $L'_{ov2,+}$, smaller than the respective width $L'_{ov2,r}$ of the rest condition of FIG. 2.

In particular, here, it is $L'_{ov2,+}=L'_{ov2,r}-X_D$.

As a result, the second top electrode 20B exerts, on the movable mass 7, an electrostatic force $F'_{2,+}$ that is lower than the respective electrostatic force $F'_{2,r}$ of the rest condition of FIG. 2.

Similarly, the variable surface $S'_1$ of the first bottom electrode 21A has a minimum width $L'_{ov1,+}$, lower than the respective width $L'_{ov1,r}$ of the rest condition of FIG. 2.

In particular, here, $L'_{ov1,+}=L'_{ov1,r}-X_D$.

As a result, the first bottom electrode 21A exerts, on the movable mass 7, an electrostatic force $F'_{1,+}$ that is lower than the electrostatic force $F'_{1,r}$ of the rest condition of FIG. 2.

Furthermore, the electrostatic force $F'_{1,+}$ exerted by the first bottom electrode 21A is lower, in magnitude, than the electrostatic force $F'_{2,+}$ exerted by the second top electrode 20B, since the first voltage $V_1$ is lower than the second voltage $V_2$.

In practice, as also shown in the force diagram of FIG. 5, in the condition of maximum positive offset $+X_D$ of the movable mass 7 along the driving axis D, the movable mass 7 is subject to a total quadrature compensation force $F_{Q,comp,+}$ different from zero, parallel to the detection axis S and directed downwards in FIG. 3.

As a result, the total quadrature compensation force $F_{Q,comp,+}$ may compensate for the maximum positive quadrature force $F_{Q,+}$.

When the movable mass 7 has a negative offset $x_D$, i.e., it moves towards decreasing coordinates along the driving axis D (to the left in FIG. 4), the movable mass 7 is subject to a variable quadrature compensation force $F_{Q,comp}$, parallel to the detection axis S and directed upwards in FIG. 4.

In detail, when the movable mass 7 moves to the left, the area of the variable surface $S_1$ of the first top electrode 20A and the area of the variable surface $S_2$ of the second bottom electrode 21B decrease with respect to the rest condition of FIG. 2.

Conversely, the area of the variable surface $S'_2$ of the second top electrode 20B and the area of the variable surface $S'_1$ of the first bottom electrode 21A increase with respect to the rest condition of FIG. 2.

By way of example, FIG. 4 shows the MEMS gyroscope 1 along section line II-II of FIG. 1, when the movable mass 7 is subject to an offset $x_D$ that is maximum and negative, equal to $-X_D$, with respect to the equilibrium position xd=0. In FIG. 4, the rest position of the movable mass 7 is indicated for sake of clarity by a dashed line.

In the condition of maximum negative offset $-X_D$, a maximum negative quadrature force $F_{Q,-}$, directed downwards in FIG. 3, acts on the movable mass 7.

In detail, in the condition of maximum negative offset $-X_D$ of FIG. 4, the variable surface $S_1$ of the first top electrode 20A has a minimum width $L_{ov1,-}$, smaller than the respective width $L_{ov1,r}$ of the rest condition of FIG. 2.

In particular, here, it is $L_{ov1,-}=L_{ov1,r}-X_D$.

As a result, the first top electrode 20A exerts, on the movable mass 7, an electrostatic force $F_{1,-}$ that is lower than the electrostatic force $F_{1,r}$ of the rest condition of FIG. 2.

Similarly, again with reference to the condition of maximum negative offset $-X_D$ of FIG. 4, the variable surface $S_2$ of the second bottom electrode 21B has a minimum width $L_{ov2,-}$, smaller than the respective width $L_{ov2,r}$ of the rest condition of FIG. 2.

In particular, here, $L_{ov2,-}=L_{ov2,r}-X_D$.

As a result, the second bottom electrode 21B exerts, on the movable mass 7, an electrostatic force $F_{2,-}$ that is lower than the electrostatic force $F_{2,r}$ of the rest condition of FIG. 2.

Furthermore, the electrostatic force $F_{1,-}$ exerted by the first top electrode 20A is lower, in magnitude, than the electrostatic force $F_{2,-}$ exerted by the second bottom electrode 21B, since the first voltage $V_1$ is lower than the second voltage $V_2$.

Again with reference to the condition of maximum negative offset $-X_D$ of FIG. 4, the variable surface $S'_2$ of the second top electrode 10B has a maximum width $L'_{ov2,-}$, greater than the respective width $L'_{ov2,r}$ of the rest condition of FIG. 2.

In particular, here, it is $L'_{ov2,-}=L'_{ov2,r}+X_D$.

As a result, the second top electrode 20B exerts, on the movable mass 7, an electrostatic force $F'_{2,-}$ that is greater than the respective electrostatic force $F'_{2,r}$ of the rest condition of FIG. 2.

Similarly, the variable surface $S'_1$ of the first bottom electrode 21A has a maximum width $L'_{ov1,-}$, greater than the respective width $L'_{ov1,r}$ of the rest condition of FIG. 2.

In particular, here, $L'_{ov1,-}=L'_{ov1,r}+X_D$.

As a result, the first bottom electrode 21A exerts, on the movable mass 7, an electrostatic force $F'_{1,-}$ that is greater than the electrostatic force $F'_{1,r}$ of the rest condition of FIG. 2.

Furthermore, the electrostatic force $F'_{1,-}$ exerted by the first bottom electrode 21A is lower, in magnitude, than the electrostatic force $F'_{2,-}$ exerted by the second top electrode 20B, since the first voltage $V_1$ is lower than the second voltage $V_2$.

In practice, as also shown in the force diagram of FIG. 5, in the condition of maximum negative offset $-X_D$ of the movable mass 7 along the driving axis D, the movable mass 7 is subject to a total quadrature compensation force $F_{Q,comp,-}$ different from zero, parallel to the detection axis S and directed upwards in FIG. 4.

As a result, the total quadrature compensation force $F_{Q,comp,-}$ may compensate for the maximum negative quadrature force $F_{Q,-}$.

With reference to FIGS. 3 and 4 and to what has been described above, the width along the first axis X of the electrodes of the top compensation electrode group 20 and/or of the bottom compensation electrode group 21, may be chosen so that even in the condition of maximum positive offset $+X_D$ the variable surfaces of the electrodes of the top compensation electrode group 20 and/or of the bottom compensation electrode group 21 which face the movable mass 7 have a non-zero width.

Additionally or alternatively, the width along the first axis X of the electrodes of the top compensation electrode group 20 and/or of the bottom compensation electrode group 21, may be chosen so that even in the condition of maximum negative offset $-X_D$ the variable surfaces of the electrodes of the top compensation electrode group 20 and/or of the bottom compensation electrode group 21 which face the movable mass 7 have a non-zero width.

In other words, the electrodes of the top compensation electrode group 20 and/or of the bottom compensation electrode group 21 may be designed to have, in any driving condition of the movable mass 7, a portion facing directly, along the third axis Z, the movable mass 7.

For example, assuming that the maximum positive offset $+X_D$ and the maximum negative offset $-X_D$ are equal in magnitude and comprised, for example, between 2 μm and 12 μm, the width $W_1$, $W'_2$ of the electrodes of the top compensation electrode group 20 and/or the width $W_2$, $W'_1$ of the bottom compensation electrode group 21 may be chosen so as to be greater than or equal to twice the value, in magnitude, of the maximum positive offset $+X_D$, for example said widths may each be comprised between 4 μm and 26 μm.

The presence of the top compensation electrode group 20 and of the bottom compensation electrode group 21 allows to obtain a total quadrature compensation force that is greater than a known MEMS gyroscope having, for example, the bottom compensation electrode group without the top compensation electrode group.

Figure 6:
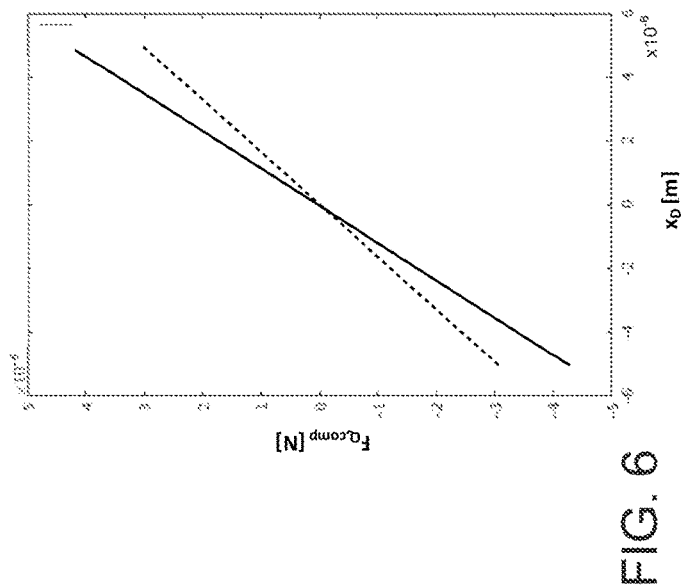

For example, in the simulation of FIG. 6 performed by the Applicant, the solid line curve and the dashed line curve show the trend of the quadrature compensation force $F_{Q,comp}$ (normalized with respect to the quadrature compensation force of the respective rest condition) as a function of the offset $x_D$, respectively for the MEMS gyroscope 1 and for a known MEMS gyroscope having the bottom quadrature compensation electrode group without the top compensation electrode group.

As is noted, in the MEMS gyroscope 1, the movable mass 7 is subject to a quadrature compensation force that is greater, in magnitude, than the known MEMS gyroscope indicated by the dashed line curve.

For example, the movable mass of the present MEMS gyroscope may be subject to a quadrature compensation force that is greater than an amount comprised between 40% and twice the known gyroscope, according to the specific implementation of the present MEMS gyroscope.

It will be clear to the person skilled in the art that what has been described above for the first detection unit 4 also applies to the second detection unit 5.

In fact, when the movable mass 7' is driven in motion along the driving direction, the facing surfaces of the top electrode group 20' and of the bottom electrode group vary as a function of the displacement along the driving axis D of the movable mass 7'. By biasing the top electrode group 20' and the bottom electrode group of the second detection unit 5, it is thus possible to compensate for the quadrature force acting, in use, on the movable mass 7'.

Thus, in practice, the MEMS gyroscope 1 is able to effectively compensate for the quadrature force acting on the movable masses 7, 7', for example reducing the die area occupation, and therefore the cost, of the MEMS gyroscope 1 and using lower voltages, and thus decreasing the energy consumption of the MEMS gyroscope 1.

Furthermore, again with reference to the first detection unit 4 for simplicity, the presence of the bottom compensation electrode group 21 and of the top compensation electrode group 20 allows to prevent that variations at rest of the first height $g_1$ and/or of the second height $g_2$ (FIG. 2), for example caused by temperature, humidity, mechanical stress or other external factors, degrade the performances of the MEMS gyroscope 1.

Consider, for example, that the MEMS gyroscope 1 is accommodated in an encapsulating body or package, not shown here, for example to protect the MEMS gyroscope 1 from external contaminants, and consider that the package is subject, during the life of the MEMS gyroscope 1, to a deformation caused by external agents such as temperature, mechanical stresses, etc.

This deformation may generate a variation Δg in the first height $g_1$ and in the second height $g_2$. For example, the deformation may cause an average approach of the movable mass 7 towards the top compensation electrode group 20 by an amount equal to the variation Δg, and an average separation of the movable mass 7 away from the bottom compensation electrode group 21 by an amount equal to the variation Δg.

As a result, taking by way of example the first top electrode 20A, it is possible to demonstrate that the electrostatic force exerted by the first top electrode 20A on the movable mass 7 as a function of the offset $x_D$ of the movable mass 7 is proportional to the amount $x_d \cdot V^2_1/(g_1-\Delta g)^2$.

Similarly, the electrostatic force exerted by the first bottom electrode 21A on the movable mass 7 as a function of the offset $x_D$ of the movable mass 7 is proportional to the amount $x_d \cdot V^2_1/(g_2+\Delta g)^2$.

In a similar manner it is obtained that the electrostatic force exerted by the second top electrode 20B is proportional to $x_d \cdot V^2_2/(g_2-\Delta g)^2$ and the electrostatic force exerted by the second bottom electrode 21B is proportional to $x_d \cdot V^2_2/(g_2+\Delta g)^2$.

It is also possible to demonstrate that the presence of the bottom compensation electrode group 21 and of the top compensation electrode group 20 allows the electrostatic softening variation to be reduced as a function of the variation Δg, with respect, for example, to a known MEMS gyroscope having the bottom quadrature compensation electrode group without the top compensation electrode group.

Figure 7:
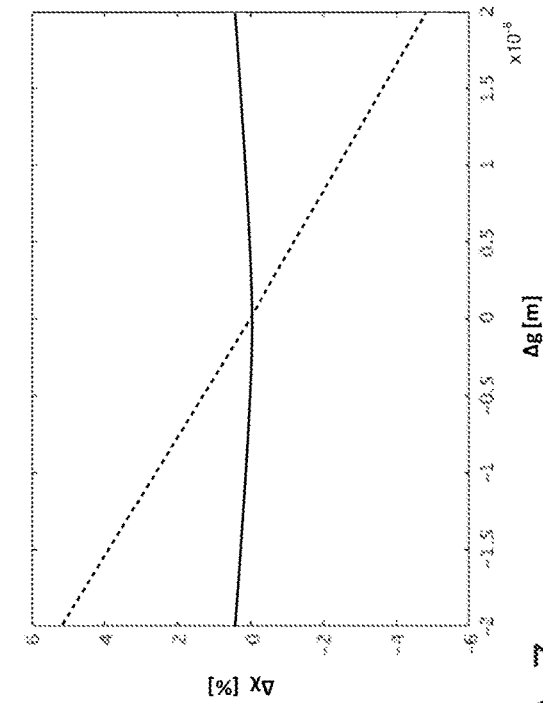
FIGS. 6 and 7 show graphs of quantities associated with the operation of the MEMS gyroscope of FIG. 1.

For example, in the simulation of FIG. 7 performed by the Applicant, the solid line curve and the dashed line curve show the behavior of the electrostatic softening percentage variation $\Delta\chi$ as a function of the variation $\Delta g$, respectively for the MEMS gyroscope 1 and for a known MEMS gyroscope having the bottom quadrature compensation electrode group without the top compensation electrode group.

As is noted, the MEMS gyroscope 1 is subject to a much lower electrostatic softening percentage variation than the known MEMS gyroscope indicated by the dashed line curve, in particular even up to ten times lower.

It will be clear to the person skilled in the art that this reduction in the electrostatic softening percentage variation described above for the first detection unit 4 also applies to the second detection unit 5.

As a result, the MEMS gyroscope 1 has a higher sensitivity stability and therefore a higher accuracy and reliability in detecting the angular speed $\Omega_Y$.

Figure 8:
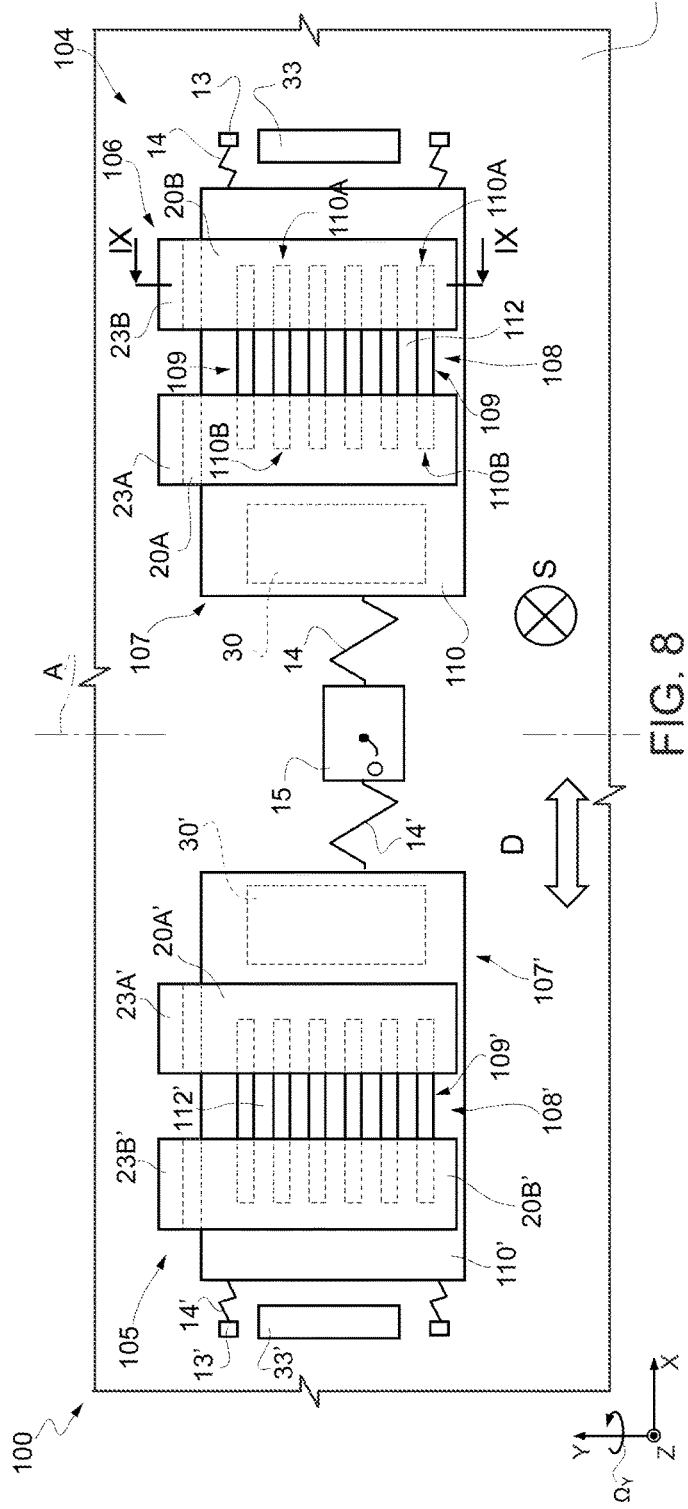
FIG. 8 shows a top-plan view of the present MEMS gyroscope, according to another embodiment.
Figure 9:
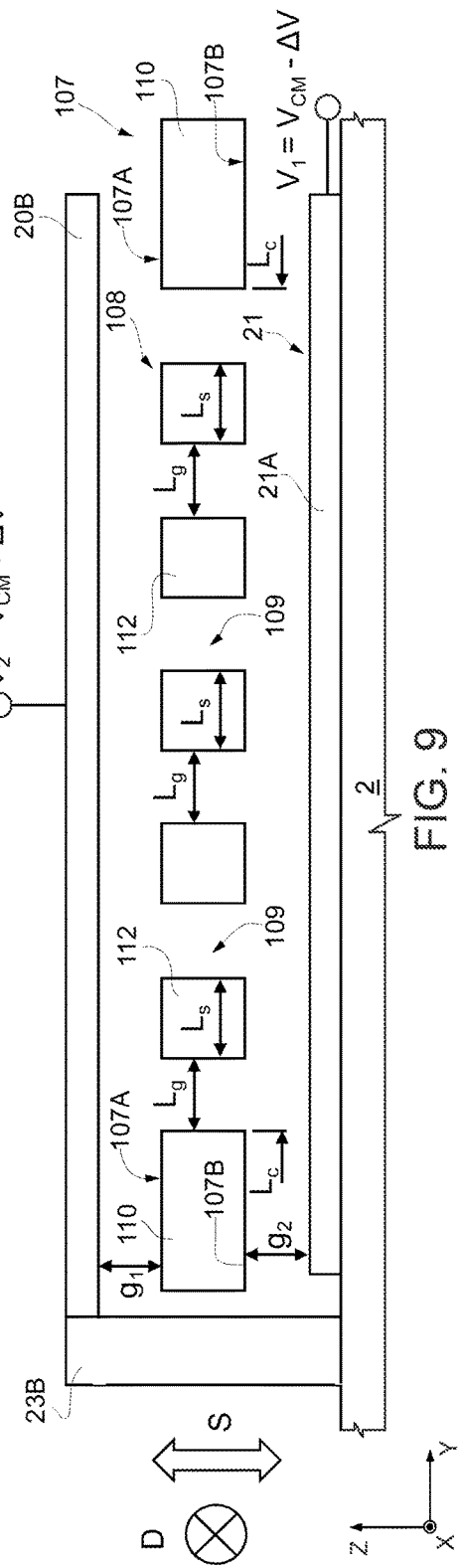
FIG. 9 shows a cross-section of the MEMS gyroscope of FIG. 8, at rest, along section line IX-IX of FIG. 8.

FIGS. 8 and 9 show another embodiment of the present MEMS gyroscope, here indicated by 100.

The MEMS gyroscope 100 has a general structure similar to the MEMS gyroscope 1 of FIG. 1; as a result, elements in common are indicated by the same reference numerals and are not further described.

In detail, the MEMS gyroscope 100 is formed by the substrate 2 and comprises a first detection unit, here indicated by 104, and a second detection unit, here indicated by 105, each configured to detect a roll angular speed $\Omega_Y$ of the MEMS gyroscope 1 around the second axis Y.

The first detection unit 104 comprises a movable mass, here indicated by 107 and having a top surface 107A and a bottom surface 107B.

The first detection unit 104 further comprises also a quadrature compensation unit, here indicated by 106, and configured to cancel, in use, a quadrature force acting on the movable mass 107, as described in detail below.

The movable mass 107 is formed by a discontinuous portion 108 and by a solid portion 110, which here surrounds the discontinuous portion 108.

The solid portion 110 is coupled to the anchoring regions 13 and to the central anchoring region 15 via flexures 14.

The discontinuous portion 108 has a length $L_c$ along the second axis Y and is formed by one or more arms, here a plurality of arms 112 mutually separated from each other, along the second axis Y, by a plurality of openings 109.

The arms 112, here rectangular in shape, each extend along a direction parallel to the first axis X, between two ends integral with the solid portion 110 of the movable mass 107, and have a width $L_s$ along the second axis Y for example comprised between 0.5 μm and 2 μm.

However, the arms 112 may have a different shape, for example squared or trapezoidal, and may for example extend along a direction transverse to the first axis X.

The openings 109 are each delimited, along the first axis X, by a respective first inner wall 110A and a respective second inner wall 110B of the solid portion 110 of the movable mass 107.

In this embodiment, the openings 109 each have a width $L_g$, along the second axis Y, greater than 1 μm, for example comprised between 1 μm and 5 μm, which is uniform throughout the respective length along the first axis X.

In practice, in this embodiment, the first inner walls 110A and the second inner walls 110B each have a length, along the second axis Y, equal to the width $L_g$ of the openings 109.

The number of arms 112, the width $L_s$ of the arms 112 and the width $L_g$ of the openings 109 may be determined, during the design step, according to the specific application, in particular as a function of specific manufacturing desires, as described in greater detail below.

The first detection unit 104 further comprises, here as well, the top electrode group 20, including the first top electrode 20A and the second top electrode 20B, and the bottom electrode group 21, including the first bottom electrode 21A and the second bottom electrode (not shown here).

The discontinuous portion 108 of the movable mass 107, the top electrode group 20 and the bottom electrode group 21 form the quadrature compensation unit 106.

The first top electrode 20A and the second top electrode 20B each extend suspended above the movable mass 107, from a respective anchoring pillar 23A, 23B integral with the substrate 2.

The first top electrode 20A extends at the first height $g_1$ along the third axis Z from the top surface 107A of the movable mass 107, on the second inner walls 110B of the solid portion 110 of the movable mass 107.

In detail, the first top electrode 20A extends partially on the solid portion 110 of the movable mass 107 and partially on the discontinuous portion 108 of the movable mass 107.

In this embodiment, the first top electrode 20A extends throughout the length $L_c$ of the discontinuous portion 108; in particular, the first top electrode 20A here has a length that is greater than the length $L_c$ of the discontinuous portion 108, along the second axis Y.

The second top electrode 20B extends at the first height $g_1$ along the third axis Z from the top surface 107A of the movable mass 107, on the first inner walls 110A of the solid portion 110 of the movable mass 107.

In detail, in this embodiment, the second top electrode 21B is equal to the first top electrode 20A and translated parallel to the first axis X, so as to partially extend on the solid portion 110 of the movable mass 107 and partially on the discontinuous portion 108 of the movable mass 107.

The first bottom electrode 21A and the second bottom electrode 21B are fixed to the substrate 2 and extend below the movable mass 107, at the second height $g_2$ along the third axis Z from the bottom surface 107B of the movable mass 107.

In detail, in this embodiment, the first bottom electrode 21A and the second bottom electrode (not shown) extend parallel to the second top electrode 20B, under the first inner wall 110A of the solid portion 110 of the movable mass 107, and, respectively, parallel to the first top electrode 20A, under the second inner wall 110B of the solid portion 110 of the movable mass 107.

In this embodiment, the first bottom electrode 21A and the second bottom electrode (not shown) extend throughout the length $L_c$ of the discontinuous portion 108; in particular, for a length that is greater than the length $L_c$ along the second axis Y.

The first detection unit 104 further comprises the fixed detection electrode 30 (represented by a dashed line in FIG. 8), which is fixed to the substrate 2 and extends under the solid portion 110 of the movable mass 107, facing the bottom surface 107B of the movable mass 107.

The first detection unit 104 also comprises the fixed driving electrode 33 extending at a distance, along the first axis X, from the movable mass 107.

Also in this embodiment, the second detection unit 105 is equal to the first detection unit 104 and arranged symmetrically thereto with respect to the central plane A. As a result, the elements of the second detection unit 105 are indicated by the same reference numerals, with the addition of an apex, of the respective elements of the first detection unit 104 and are not further described in detail.

The second detection unit 105 is formed by a movable mass 107' comprising a discontinuous portion 108' and a solid portion 110', and is coupled to the central anchoring portion 15 and to respective anchoring regions 13' through flexures 14'.

The second detection unit 105 comprises a respective top compensation electrode group 20' including a first and a second top electrode 20A', 20B', and a respective bottom compensation electrode group, not shown here.

The top compensation electrode group 20' also includes here a first top electrode 20A' and a second top electrode 20B' each fixed to the substrate 2 through a respective anchoring pillar 23A', 23B'.

Furthermore, the second detection unit 5 comprises a respective fixed detection electrode 30' and a respective fixed driving electrode 33', coupled to the movable mass 107' to detect a movement thereof along the detection axis S and, respectively, to drive a movement thereof along the driving axis D.

In use, with reference to the first detection unit 104, the presence of the top electrode group 20 and of the bottom electrode group 21 allows to cancel a quadrature force acting on the movable mass 107, similarly to what has been discussed for the MEMS gyroscope 1.

Furthermore, also in the MEMS gyroscope 100, the top electrode group 20 and the bottom electrode group 21 ensure that any variation of the first and the second heights $g_1$, $g_2$, does not cause, as a first approximation, an electrostatic softening variation of the MEMS gyroscope 100.

In practice, also the MEMS gyroscope 100 therefore has a high reliability and accuracy in detecting the angular speed $\Omega_Y$.

Furthermore, the arms 112 may be useful during the manufacturing of the MEMS gyroscope 100. In fact, the top electrode group 20 may be manufactured by depositing a sacrificial layer, for example of oxide, on the top surface 107A of the movable mass 107, by growing a silicon or polysilicon epitaxial layer on the sacrificial layer, and by removing the sacrificial layer.

The arms 112 may act as a support base for the sacrificial layer and therefore may increase the mechanical stability of the MEMS gyroscope 1 during manufacturing, improving its reliability.

The arms 112 may be designed so that the width $L_g$ of the openings 109 is as large as possible. In this manner, it is possible to maximize the variation of the variable facing surface of the top compensation electrode group 20 on the movable mass 7 (and therefore to maximize the quadrature compensation force variation), as a function of the offset $x_D$ of the movable mass 7.

Figure 10:
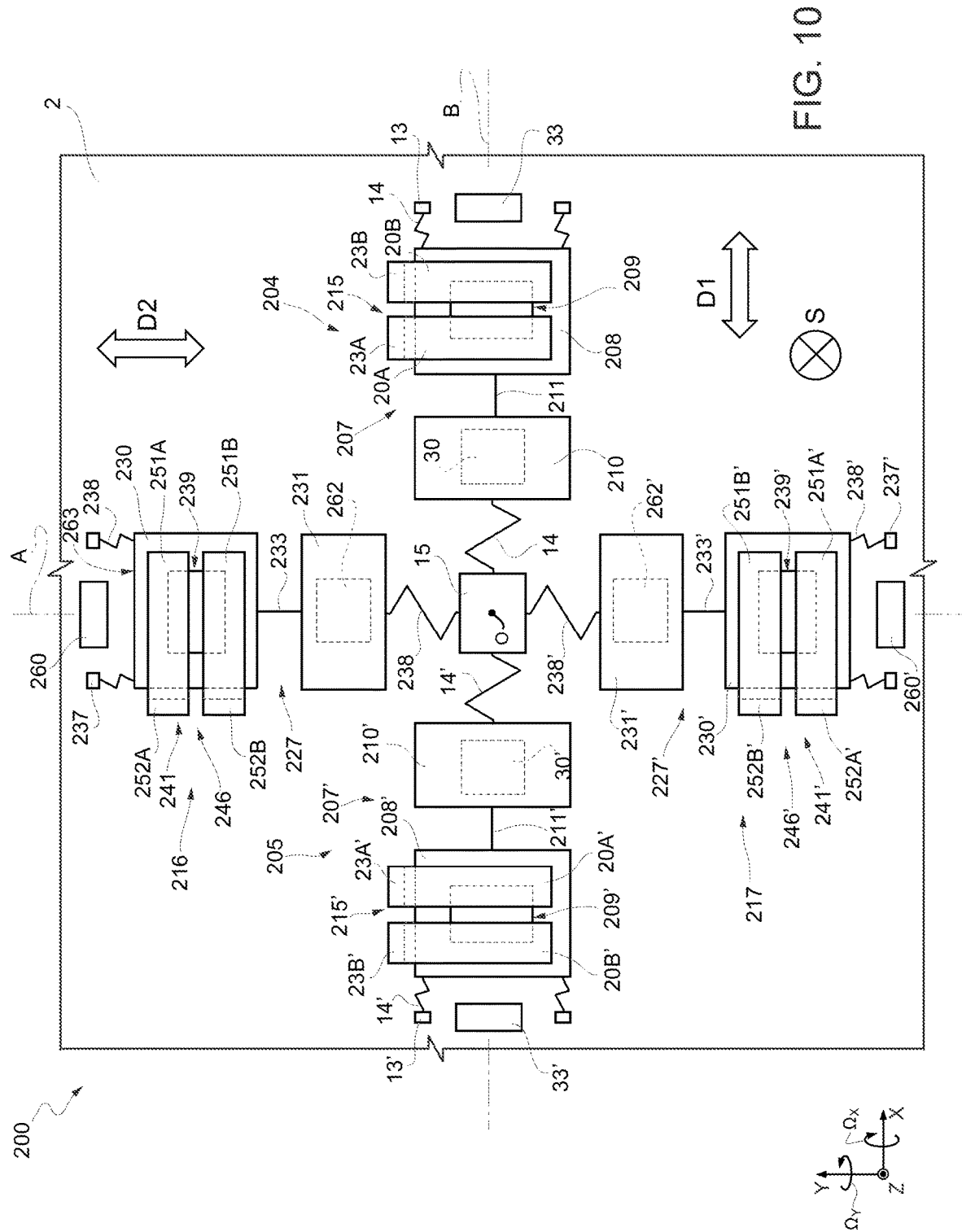
FIG. 10 shows a top-plan view of the present MEMS gyroscope, according to a different embodiment.

FIG. 10 shows a different embodiment of the present MEMS gyroscope, here indicated by 200, in the Cartesian reference system XYZ.

The MEMS gyroscope 200 is of biaxial type and is configured to detect a roll angular speed $\Omega_Y$ of the MEMS gyroscope 100 around the second axis Y and a pitch angular speed $\Omega_X$ of the MEMS gyroscope 100 around the first axis X.

The MEMS gyroscope 200 comprises a first and a second detection unit 204, 205, configured to detect the roll angular speed $\Omega_Y$, and a third and a fourth detection unit 216, 217, configured to detect the pitch angular speed $\Omega_X$.

The first and second detection units 204, 205 are here equal to each other and are arranged symmetrically with respect to a first central plane A passing through a center O of the MEMS gyroscope 200 and parallel to a plane YZ formed by the second axis Y and the third axis Z. Furthermore, the first and the second detection units 204, 205 have a general structure similar to the first and the second detection units 4, 5 of the MEMS gyroscope 1 of FIG. 1. As a result, elements in common are indicated by the same reference numerals and are not further described.

In detail, the first detection unit 204 is formed by a movable mass 207 comprising a detection mass 210 and a compensation mass 208, mutually coupled by a connection element 211.

The connection element 211 may be a flexure, for example linear or folded, or rigid, depending on the specific application.

The compensation mass 208 laterally delimits an opening 209, which crosses the compensation mass 208 throughout its thickness along the third axis Z, as described for the opening 9 of the MEMS gyroscope 1 of FIG. 1.

The compensation mass 208 is coupled to respective anchoring regions 13, fixed to the substrate 2, through respective flexures 14.

The detection mass 210 is coupled to a central anchoring region 15 through a respective flexure 14.

The first detection unit 204 further comprises, as described with reference to the MEMS gyroscope 1 of FIGS. 1 and 2, the top compensation electrode group 20 extending on the compensation mass 208, facing, at rest, partially the compensation mass 208 and partially the opening 209, and the bottom compensation electrode group (not shown here), extending under the compensation mass 208 parallel to the top compensation electrode group 20.

The top electrode group 20, the bottom electrode group and the opening 209 form a quadrature compensation unit, here indicated by 215.

The first detection unit 204 also comprises the driving electrode 33 and the detection electrode 30.

The driving electrode 33 is capacitively coupled to the compensation mass 208 and is configured to cause a movement thereof, in particular an oscillation at a resonance frequency, along a first driving axis D1 parallel to the first axis X.

The detection electrode 30 is capacitively coupled to the detection mass 210 and is configured to detect a movement thereof along the detection axis S, parallel to the third axis Z.

Here as well, the elements of the second detection unit 205 are indicated with the same reference numerals, with the addition of an apex, as the respective elements of the first detection unit 204 and are not further described in detail.

The second detection unit 205 comprises a quadrature compensation unit 215' and is formed by a movable mass 207' comprising a compensation mass 208' having an opening 209', and a detection mass 210', mutually coupled by a connection element 211'.

The third detection unit 216 is formed by a movable mass 227 comprising a respective compensation mass 230 and a respective detection mass 231, mutually coupled by a respective connection element 233, which may be elastic or rigid, depending on the specific application.

The compensation mass 230 is coupled to respective anchoring regions 237 through respective flexures 238, which extend along the second axis Y and allow the movement of the compensation mass 230 with one or more degrees of freedom, here along the second axis Y and along the third axis Z.

The compensation mass 230 laterally delimits an opening 239, which extends through the compensation mass 230 throughout its thickness, along the third axis Z.

The detection mass 231 is coupled to the central anchoring region 15 by a respective flexure 238.

The third detection unit 216 further comprises a top compensation electrode group 241 and a bottom compensation electrode group (not shown here), which form, with the opening 239, a quadrature compensation unit 246, in a similar manner to what has been described for the compensation unit 6 of the MEMS gyroscope 1 of FIG. 1.

In detail, also in this embodiment, the top compensation electrode group 241 extends on the compensation mass 230 and comprises a first and a second top electrode 251A, 251B, fixed to the substrate 2 through respective anchoring pillars 252A, 252B.

The first and the second top electrodes 251A, 251B extend along a direction parallel to the first axis X, facing, at rest, partially on the compensation mass 230 and partially on the opening 239.

The electrodes of the bottom compensation electrode group, not shown here, extend under the compensation mass 230, parallel to the first and the second top electrodes 251A, 251B, similarly to what has been described for the bottom compensation electrode group 21 of the MEMS gyroscope 1.

The third detection unit 205 further comprises a respective driving electrode 260 and a respective detection electrode 262.

The driving electrode 260 extends at a distance, along the second axis Y, from a wall 263 of the compensation mass 230.

The driving electrode 260 is capacitively coupled to the compensation mass 230 and is configured to cause a movement thereof, in particular an oscillation at a resonance frequency, along a second driving axis D2 parallel to the second axis Y.

The detection electrode 262 extends on the substrate 2, under the detection mass 231, facing thereto, and is configured to detect a movement of the detection mass 231 along the detection axis S.

The fourth detection unit 217 is here equal to the third detection unit 216 and symmetrically arranged thereto with respect to a second central plane B passing through the center O of the MEMS gyroscope 200 and parallel to a plane XZ formed by the first axis X and by the third axis Z.

The elements of the fourth detection unit 217 are indicated by the same reference numerals, with the addition of an apex, as the respective elements of the third detection unit 216, and are not further described in detail.

The fourth detection unit 217 is formed by a movable mass 227' comprising a compensation mass 230' and a detection mass 231', mutually coupled by a connection element 233'.

The compensation mass 230' laterally delimits an opening 239' and is coupled to respective anchoring regions 237' through flexures 238'. The detection mass 231' is coupled to the central anchoring region 15 by a respective flexure 238'.

The fourth detection unit 217 is further formed by a top compensation electrode group 241' and a bottom compensation electrode group (not shown here), which form, with the opening 239', a quadrature compensation unit 246'.

The top compensation electrode group 241' comprises a first top electrode 251A' and a second top electrode 251B', each fixed to the substrate 2 by a respective anchoring pillar 252A', 252B'.

The fourth detection unit 217' comprises a driving electrode 260', coupled to the compensation mass 230', and a detection electrode 262', coupled to the detection mass 231'.

In use, the first and the second detection units 204, 205 have a behavior similar to what has been discussed for the first and the second detection units 4, 5 of the MEMS gyroscope 1.

Furthermore, it will be clear to the person skilled in the art that the third and the fourth detection units 216, 217 also have a behavior similar to that of the first and the second detection units 204, 205, as regards the pitch angular speed $\Omega_X$.

In practice, the MEMS gyroscope 200 has high detection performances both with respect to the roll angular speed $\Omega_Y$, and with respect to the pitch angular speed $\Omega_X$.

Finally, it is clear that modifications and variations may be made to the MEMS gyroscopes 1, 100, 200 described and illustrated herein without thereby departing from the scope of the present disclosure.

For example, the total value of the compensation force applied to the movable mass may be adjusted by modifying the number of quadrature compensation units, i.e., by increasing the number of openings, top compensation electrodes and bottom compensation electrodes, depending on the specific application.

Shape and number of the anchoring pillars 23A, 23B, 252A, 252B of the top compensation electrode group 20, 241 may be different from what has been shown. For example, the top compensation electrode group 20, 241 may be constrained on two ends, i.e., the electrodes may be of the clamped-clamped type, so as to have a bridge shape on the respective movable mass.

Finally, the described embodiments may be combined to form further solutions.

A MEMS gyroscope (1; 100; 200) may be summarized as including a substrate (2); a movable mass (7, 7'; 107, 107'; 207, 207', 227, 227') suspended on the substrate and configured to carry out a movement in a driving direction (X, D; X, Y, D1, D2) and in a detection direction (Z, S) perpendicular to each other, the movable mass having a first face (7A; 107A) and a second face (7B; 107B) opposite to the first face; a first quadrature compensation electrode group (20, 20'; 241, 241'), fixed to the substrate and capacitively coupled to the movable mass, the first quadrature compensation electrode group facing the first face of the movable mass; and a second quadrature compensation electrode group (21, 21'), fixed to the substrate and capacitively coupled to the movable mass, the second quadrature compensation electrode group facing the second face of the movable mass, the first and the second quadrature compensation electrode groups each having a respective variable facing area ($S_1$, $S_2$, $S'_1$, $S'_2$) on the movable mass as a result of the movement of the movable mass in the driving direction, wherein the first and the second quadrature compensation electrode groups are configured to exert an electrostatic force on the movable mass during the movement of the movable mass in the driving direction.

The movable mass may have a through opening (9; 109; 209, 239), the through opening extending through the movable mass (7, 7'; 107, 107'; 207, 207', 227, 227') between the first and the second faces of the movable mass, parallel to the detection direction (Z, S), the first quadrature compensation electrode group extending at a first height ($g_1$), parallel to the detection direction, with respect to the first face of the movable mass and the second quadrature compensation electrode group extending at a second height ($g_2$), parallel to the detection direction, with respect to the second surface of the movable mass.

The first quadrature compensation electrode group (20, 20'; 241, 241') may partially face the first face of the movable mass and partially faces the through opening and the second quadrature compensation electrode group (21, 21') may partially face the second face of the movable mass and partially faces the through opening.

The movable mass may have an inner wall (10A, 10B; 110A, 110B) delimiting the through opening (9; 109) and extending in a direction (Y) transverse to the driving direction (D) and perpendicular to the detection direction (S), the first quadrature compensation electrode group comprising a first electrode (20A, 20B) arranged at the first height with respect to the inner wall, the second quadrature compensation electrode group comprising a first electrode (21A, 21B) arranged at the second height with respect to the inner wall.

The inner wall of the movable mass may extend in a direction perpendicular to the driving direction and the detection direction.

The inner wall (10A; 110A) of the movable mass may be a first inner wall forming a first side of the through opening (9; 109), the movable mass further having a second inner wall (10B; 110B) forming a second side of the through opening arranged at a distance from the first side along the driving direction (D), the second inner wall extending in a direction (Y) transverse to the driving direction (D) and perpendicular to the detection direction (S), the first quadrature compensation electrode group comprising a second electrode (20B) arranged at the first height with respect to the second inner wall, the second quadrature compensation electrode group comprising a second electrode (21A) arranged at the second height with respect to the second inner wall.

The first height ($g_1$) may be equal to the second height ($g_2$).

The movable mass (107, 107') may include at least one arm (112) extending along the driving direction (X, D), through the through opening (109).

The at least one arm may be a first arm, the MEMS gyroscope may further include a second arm extending at a distance that is greater than 1 μm from the first arm along a direction (Y) perpendicular to the driving direction (X, D) and the detection direction (Z, S).

The MEMS gyroscope may further include a driving electrode (33, 33'; 260, 260') and a detection electrode (30, 30'; 262, 262'), the driving electrode being fixed to the substrate (2), capacitively coupled to the movable mass (7, 7'; 107, 107'; 207, 207', 227, 227') and configured to cause the movement of the movable mass in the driving direction (D; D1, D2), the detection electrode being fixed to the substrate, capacitively coupled to the movable mass and configured to detect the movement of the movable mass in the detection direction (S), wherein the movable mass, the first quadrature compensation electrode group, the second quadrature compensation electrode group, the driving electrode and the detection electrode form a first rotation detection unit (4, 5; 104, 105; 204, 205, 217, 217') configured to detect a rotation ($\Omega_Y$; $\Omega_X$) of the MEMS gyroscope around a first direction (Y; X) perpendicular to the detection direction (S) and to the driving direction (D; D2).

The driving direction of the first rotation detection unit (204, 204') may be a first driving direction (D1), the MEMS gyroscope may further include a second rotation detection unit (216, 217) configured to detect a rotation of the MEMS gyroscope around the first driving direction, the second rotation detection unit having a respective movable mass (227, 227') configured to move in the detection direction and in a second driving direction parallel to the first direction (Y).

A method for compensating a quadrature error of a MEMS gyroscope comprising a substrate (2); a movable mass (7, 7'; 107, 107'; 207, 207', 227, 227') suspended on the substrate and configured to carry out a movement in a driving direction (X, D; X, Y, D1, D2) and in a detection direction (Z, S) perpendicular to each other, the movable mass having a first face (7A; 107A) and a second face (7B; 107B) opposite to the first face; a first quadrature compensation electrode group (20, 20'; 241, 241'), fixed to the substrate and capacitively coupled to the movable mass, the first quadrature compensation electrode group facing the first face of the movable mass; and a second quadrature compensation electrode group (21, 21'), fixed to the substrate and capacitively coupled to the movable mass, the second quadrature compensation electrode group facing the second face of the movable mass, the first and the second quadrature compensation electrode groups each having a respective variable facing area ($S_1$, $S_2$, $S'_1$, $S'_2$) on the movable mass as a result of the movement of the movable mass in the driving direction, may be summarized as including providing a first compensation voltage ($V_1$) to the first quadrature compensation electrode group; and providing a second compensation voltage ($V_2$) to the second quadrature compensation electrode group.

The MEMS gyroscope may further include a third quadrature compensation electrode group (20B) facing the first face (7A; 107A) of the movable mass and a fourth quadrature compensation electrode group (21A) facing the second face (7B; 107B) of the movable mass, wherein the variable facing area ($S_1$) of the first quadrature compensation electrode group (20A) and the variable facing area ($S_2$) of the second quadrature compensation electrode group (21B) may increase when the movable mass moves in the driving direction (D), the third and the fourth quadrature compensation electrode groups each having a respective variable facing area on the movable mass, wherein the variable facing area ($S'_2$) of the third quadrature compensation electrode group (20B) and the variable facing area ($S'_1$) of the fourth quadrature compensation electrode group (21A) may decrease when the movable mass moves in the driving direction, the method may further include providing the second compensation voltage ($V_2$) to the third quadrature compensation electrode group (20B) and providing the first compensation voltage ($V_1$) to the fourth quadrature compensation electrode group (21A).

The first compensation voltage ($V_1$) may be given by the sum of a common mode voltage ($V_{CM}$) and a first correction voltage ($\Delta V$), and the second compensation voltage ($V_2$) may be given by the sum of the common mode voltage and a second correction voltage ($\Delta V$).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A micro electro-mechanical systems (MEMS) gyroscope comprising:
a substrate;
a movable mass suspended over the substrate, and configured to move in a driving direction and in a detection direction transverse to the driving direction, the movable mass having a first face and a second face opposite to the first face, the movable mass including a through opening extending through the movable mass between the first and the second faces of the movable mass;
a detection electrode fixed to the substrate, the detection electrode configured to detect movement of the movable mass in the detection direction, the movable mass directly overlying the detection electrode;
a driving electrode fixed to the substrate, the driving electrode configured to cause the movable mass to move in the driving direction, the driving electrode being spaced from a first sidewall of the movable mass;
a plurality of anchors that are spaced from a second sidewall of the movable mass and are fixed to the substrate;
a first quadrature compensation electrode group including a plurality of electrodes fixed to the substrate, and capacitively coupled to the movable mass, the first quadrature compensation electrode group facing the first face of the movable mass, the plurality of electrodes of the first quadrature compensation electrode group being coupled to plurality of anchors, respectively; and
a second quadrature compensation electrode group including a plurality of electrodes fixed to the substrate, and capacitively coupled to the movable mass, the second quadrature compensation electrode group facing the second face of the movable mass,
each of the plurality of electrodes of the first quadrature compensation electrode group directly overlies a respective electrode of the plurality of electrodes of the second quadrature compensation electrode group and a portion of the through opening in the movable mass,
the first and the second quadrature compensation electrode groups each having a respective variable facing area with the movable mass as a result of movement of the movable mass in the driving direction,
the first and the second quadrature compensation electrode groups being configured to exert an electrostatic force on the movable mass during the movement of the movable mass in the driving direction.

2. The MEMS gyroscope according to claim 1, wherein the first quadrature compensation electrode group is at a first height, parallel to the detection direction, with respect to the first face of the movable mass, and
the second quadrature compensation electrode group is at a second height, parallel to the detection direction, with respect to the second face of the movable mass.

3. The MEMS gyroscope according to claim 2, wherein the movable mass has an inner wall delimiting the through opening, and extending in a direction transverse to the driving direction and perpendicular to the detection direction,
the first quadrature compensation electrode group includes a first electrode arranged at the first height with respect to the inner wall,
the second quadrature compensation electrode group includes a first electrode arranged at the second height with respect to the inner wall.

4. The MEMS gyroscope according to claim 3, wherein the inner wall of the movable mass extends in a direction perpendicular to the driving direction and the detection direction.

5. The MEMS gyroscope according to claim 3, wherein the inner wall of the movable mass is a first inner wall that is at a first side of the through opening,
the movable mass includes a second inner wall that is at a second side of the through opening arranged at a distance from the first side along the driving direction,
the second inner wall extends in a direction transverse to the driving direction and perpendicular to the detection direction,
the first quadrature compensation electrode group includes a second electrode arranged at the first height with respect to the second inner wall, and
the second quadrature compensation electrode group includes a second electrode arranged at the second height with respect to the second inner wall.

6. The MEMS gyroscope according to claim 2, wherein the first height is equal to the second height.

7. The MEMS gyroscope according to claim 2, wherein the movable mass includes at least one arm extending along the driving direction, through the through opening.

8. The MEMS gyroscope according to claim 7, wherein the at least one arm is a first arm, and
the MEMS gyroscope includes a second arm extending at a distance that is greater than 1 μm from the first arm along a direction perpendicular to the driving direction and the detection direction.

9. The MEMS gyroscope according to claim 1, wherein the driving electrode is capacitively coupled to the movable mass,
the detection electrode is capacitively coupled to the movable mass,
the movable mass, the first quadrature compensation electrode group, the second quadrature compensation electrode group, the driving electrode, and the detection electrode is a first rotation detection unit configured to detect a rotation of the MEMS gyroscope around a first direction perpendicular to the detection direction and to the driving direction.

10. The MEMS gyroscope according to claim 9, wherein the driving direction of the first rotation detection unit is a first driving direction,
the MEMS gyroscope further includes a second rotation detection unit configured to detect a rotation of the MEMS gyroscope around the first driving direction, and
the second rotation detection unit has a respective movable mass configured to move in the detection direction and in a second driving direction parallel to the first direction.

11. A method for compensating a quadrature error of a micro electro-mechanical systems (MEMS) gyroscope, the method comprising:
providing first compensation voltages to a first quadrature compensation electrode group of the MEMS gyroscope, the MEMS gyroscope including:
a substrate;
a movable mass suspended over the substrate, and configured to move in a driving direction and in a detection direction transverse to the driving direction, the movable mass having a first face and a second face opposite to the first face, the movable mass including a through opening extending through the movable mass between the first and the second faces of the movable mass;
a detection electrode fixed to the substrate, the detection electrode configured to detect the movement of the movable mass in the detection direction, the movable mass directly overlying the detection electrode;
a driving electrode fixed to the substrate, the driving electrode configured to cause the movable mass to move in the driving direction, the driving electrode being spaced from a first sidewall of the movable mass;
a plurality of anchors that are spaced from a second sidewall of the movable mass and are fixed to the substrate;
the first quadrature compensation electrode group including a plurality of electrodes fixed to the substrate, and capacitively coupled to the movable mass, the first quadrature compensation electrode group facing the first face of the movable mass, the plurality of electrodes of the first quadrature compensation electrode group being coupled to the plurality of anchors, respectively; and
a second quadrature compensation electrode group including a plurality of electrodes fixed to the substrate, and capacitively coupled to the movable mass, the second quadrature compensation electrode group facing the second face of the movable mass,
each of the plurality of electrodes of the first quadrature compensation electrode group directly overlies a respective electrode of the plurality of electrodes of the second quadrature compensation electrode group and a portion of the through opening in the movable mass,
the first and the second quadrature compensation electrode groups each having a respective variable facing area with the movable mass as a result of movement of the movable mass in the driving direction; and
providing second compensation voltages to the second quadrature compensation electrode group.

12. The method according to claim 11, wherein the MEMS gyroscope includes:
a third quadrature compensation electrode group facing the first face of the movable mass; and
a fourth quadrature compensation electrode group facing the second face of the movable mass,
the variable facing area of the first quadrature compensation electrode group and the variable facing area of the second quadrature compensation electrode group increase in response to the movable mass moving in the driving direction,
the third and the fourth quadrature compensation electrode groups each have a respective variable facing area with the movable mass,
the variable facing area of the third quadrature compensation electrode group and the variable facing area of the fourth quadrature compensation electrode group decrease in response to the movable mass moving in the driving direction, and
the method includes providing the second compensation voltages to the third quadrature compensation electrode group, and providing the first compensation voltages to the fourth quadrature compensation electrode group.

13. The method according to claim 11, wherein the first compensation voltages includes a voltage given by a sum of a common mode voltage and a first correction voltage, and the second compensation voltages includes a voltage given by a sum of the common mode voltage and a second correction voltage.

14. A device, comprising:
a substrate extending in a first direction and a second direction transverse to the first direction;
a first plurality of electrodes on the substrate;
a movable mass overlying the first plurality of electrodes in a third direction transverse to the first and second directions, the movable mass configured to move in the first direction and the third direction, the movable mass having an opening;
a detection electrode fixed to the substrate, the detection electrode configured to detect the movement of the movable mass in the first direction, the movable mass overlying the detection electrode in the third direction;
a driving electrode fixed to the substrate, the driving electrode configured to cause the movable mass to move in the first direction, the driving electrode being spaced from a first sidewall of the movable mass in the first direction;
a plurality of anchors that are spaced from a second sidewall of the movable mass and are fixed to the substrate;
a second plurality of electrodes overlying the movable mass in the third direction, the second plurality of electrodes coupled to plurality of anchors, respectively,
each of the first and second plurality of electrodes being spaced from the movable mass in the third direction,
each of the first and second plurality of electrodes overlapping the movable mass and the opening in the third direction in a case where the movable mass is at a resting position.

15. The device of claim 14, wherein the first and the second plurality of electrodes are configured to exert an electrostatic force on the movable mass.

16. The device of claim 14, wherein
an electrode of the first plurality of electrodes overlies a first side of the opening, and another electrode of the first plurality of electrodes overlies a second side, opposite to the first side, of the opening, and
an electrode of the second plurality of electrodes underlies the first side of the opening, and another electrode of the second plurality of electrodes underlies the second side of the opening.

17. The device of claim 14, wherein the movable mass includes a plurality of arms extending in the first direction, and the plurality of arms are spaced from each other in the second direction.

18. The device of claim 14, further comprising:
a first voltage application element configured to apply first compensation voltages to the first plurality of electrodes; and
a second voltage application element configured to apply a second compensation voltages to the second plurality of electrodes.

19. The MEMS gyroscope according to claim 1, wherein
the plurality of electrodes of the first quadrature compensation electrode group includes a first electrode and a second electrode,
the plurality of electrodes of the second quadrature compensation electrode group includes a third electrode and a fourth electrode,
the first electrode directly overlies the third electrode,
the second electrode directly overlies the fourth electrode,
the MEMS gyroscope includes circuitry configured to apply a first voltage to the first electrode and the fourth electrode, and a second voltage, which is different from the first voltage, to the second electrode and the third electrode.

20. The MEMS gyroscope according to claim 1, wherein the movable mass includes a plurality of through openings extending through the movable mass between the first and the second faces of the movable mass, and each of the plurality of electrodes of the first quadrature compensation electrode group directly overlies a respective electrode of the plurality of electrodes of the second quadrature compensation electrode group and portions of the plurality of through openings in the movable mass.

* * * * *